United States Patent [19]

McJunkin

[11] Patent Number: 5,051,837

[45] Date of Patent: Sep. 24, 1991

[54] HOME ENTERTAINMENT EQUIPMENT CONTROL APPARATUS

[76] Inventor: Thomas N. McJunkin, 1509 Chaston Rd., Charleston, W. Va. 25314

[21] Appl. No.: 533,783

[22] Filed: Jun. 6, 1990

[51] Int. Cl.⁵ .............................................. H04N 7/167
[52] U.S. Cl. ...................................... 358/349; 358/188
[58] Field of Search ........................ 358/188, 190, 349

[56] References Cited

U.S. PATENT DOCUMENTS

| 3,569,839 | 3/1971 | Dyer . |
| 3,581,029 | 5/1971 | Noiles . |
| 3,833,779 | 9/1974 | Leone . |
| 3,879,332 | 4/1975 | Leone . |
| 4,081,754 | 3/1978 | Jackson . |
| 4,183,057 | 1/1980 | Sonnenberg . |
| 4,228,543 | 10/1980 | Jackson . |
| 4,246,495 | 1/1981 | Pressman . |
| 4,271,432 | 6/1981 | Suzuki et al. . |
| 4,279,012 | 7/1981 | Beckedorff et al. . |
| 4,317,213 | 2/1982 | DiLorenzo . |
| 4,348,696 | 9/1982 | Beier .................................. 358/349 |
| 4,484,220 | 11/1984 | Beetner . |
| 4,566,033 | 1/1986 | Reidenouer .......................... 358/349 |
| 4,718,107 | 1/1988 | Hayes . |
| 4,768,229 | 8/1988 | Benjamin et al. . |
| 4,860,005 | 8/1989 | DeLuca et al. . |

Primary Examiner—Thomas H. Tarcza
Assistant Examiner—David Cain
Attorney, Agent, or Firm—James Creighton Wray

[57] ABSTRACT

Home entertainment equipment control apparatus for limiting user access and limiting operation time. In various embodiments, the apparatus may limit the allowed operation time for one user or several specified users. In a more sophisticated embodiment, the apparatus is programmable to control the time periods during which home entertainment equipment may be used, as well as the total time for which the equipment may be used and time period durations of use by specified individual users.

23 Claims, 4 Drawing Sheets

HOME ENTERTAINMENT EQUIPMENT CONTROL APPARATUS

BACKGROUND OF THE INVENTION

Repeated studies confirm the obvious: unattended exposure by children to television viewing retards initiative, stifles imagination and mental development, and breeds both passivity and aggression. Television is unquestionably the single most important device influencing the socialization, maturation and education of children today. Its capacity to be a powerfully positive force is exceeded only by its capacity to be a degenerative force. The problem is not television itself, but the huge diversity of television offerings combined with constant accessibility. How many parents grapple with trying to "budget" television time, or with removing "the tube" altogether, only to encounter circumstances which make their well-intentioned policies impractical?

Television has been described as "the junk food of the mind". Like a bowl of candy left on the coffee table, once overconsumption has begun it is hard to stop, and usually continues until the temptation is gone or nausea sets in.

A precursor to modern control apparatus is the appliance safety lock shown in FIG. 1. It is a simple but effective means of preventing undesired use of an electric appliance, such as a television, food processor, electric hand tool, table saw, etc. it is basically a locking case in which to safely secure an appliance plug. The product can be produced very inexpensively, but would assure security and safety.

A primary disadvantage is that, for frequently used appliances, such enclosure use may prove to be a nuisance.

It is a primary object of the present invention to overcome the problems associated with uncontrolled exposure to television. The present invention is a fairly simple and effective alternative to existing home entertainment equipment control.

Existing control apparatus lack simplicity of design or operation, or both. For example, U.S. Pat. No. 4,566,033 discloses a token-activated television control apparatus which allows a pre-established amount of television viewing time per each token inserted into the control apparatus. The problem with this invention is that control of television viewing time is not simple or definite. In the common situation in which more than one person has tokens or access to tokens, the tokens, and hence the television viewing time, can be exchanged, making it necessary to monitor the tokens. Hence, the problem of control has merely been transferred from the television to the tokens.

SUMMARY OF THE INVENTION

Although alternative applications exist, the primary purpose of the present invention in all of its varying degrees of sophistication is to ensure that access to television by children is controlled.

It provides a convenient means of ensuring that television viewing is properly budgeted and monitored, making television a socializing force over which the parent has a reasonable measure of control.

How much television does your family watch per day? The present invention can tell you, and can control the consumption to a consciously established limit, jointly selected by you and your child, in advance.

In a preferred embodiment, the present invention is a lightweight, attractive enclosure that can be placed conveniently on or near the television console or appliance.

In one embodiment, a switch operated by a key or combination lock determines whether the television can be turned on. The combination lock may be set by the individual owner to a personally selected code, or opened by a "master-code" registered with a manufacturer in the event the personally selected combination is lost.

A digital LCD timing device indicates the total time the television has been in use since the mechanism was last reset, so total viewing time during a day, week or other time period can be readily determined. Access to and utilization of the television is determined by the individual who has the access key or combination, enabling a parent to control access and eliminating the temptation to fill idle time with television viewing instead of with an activity requiring mental or physical involvement on the part of a child.

In another rather basic embodiment, the present invention is a locking appliance power source with multiple key-controlled on/off switches or combinations. The operating time of an appliance is therefore controlled by the person or persons having a key or a combination to one of the switching devices. The apparatus has a power plug that can be plugged into any standard home power outlet. The apparatus can have a time display that monitors total appliance operating time. The apparatus can have another time display that monitors an individual period of operation, or multiple individual time displays, one for each lock or combination switch.

In a more sophisticated embodiment, the present invention is a fully integrated, programmable electronic timing and load control device intended to limit user access to home appliance and entertainment equipment such as televisions, stereos, video games, etc. Such an embodiment offers all of the features of the basic embodiments, plus the additional feature of programmability. A microprocessor can be programmed to operate only during specified times. Each day of a one week period may be individually programmed, enabling parents and children to determine, in advance, the total amount of television viewing as well as the specific times or day when viewing is desired and permitted. This process generates a responsible and structured approach toward television on the part of the child, who must select viewing times and then utilize his or her time in accordance with the schedule. Expectations that television will be available to fill the voids of idle time are eliminated, developing a more organized, rational and responsible pattern of behavior on the part of the child and avoiding recurring confrontations between parent and child over monitoring television and other equipment use.

This embodiment has two primary modes of operation.

A first mode, the program mode, allows event timing control for a period of seven days with four individual events (on/off cycles) per day. Timing parameters are entered using three simple push-button controls in a fashion very similar to currently offered video recorder units.

A second mode, the budget mode, allows timing control in a count-down fashion wherein the user is allotted a "budget" of time under which to use a controlled device such as a television at his or her own discretion. Thereafter, whenever the controlled device is used, the time remaining is counted down until the budget is fully depleted, at which point the invention disables the controlled device.

Programming an appliance operation time is achieved by using three program control buttons. A user of the apparatus, through the use of program control buttons, selects a mode, enters and sets desired time periods of operation, and sets the apparatus into operation.

Embodiments can be made with or without a LCD clock.

Time displays can be integrated with the control circuitry.

A cumulative time display monitors the total amount of time that an appliance has been operating over a certain time interval, such as a day or a week.

A resetting time display will monitor a specific interval of appliance operation. The timing mechanism begins displaying elapsed time when the appliance begins operating and stops when the appliance stops. The display will automatically reset when the appliance starts operating again and will begin timing again.

The cumulative and resettable time displays may be separate or may be displayed on a multi-purpose display that is also used to display programmed parameters while a user is programming the apparatus.

Applications for the present invention are not limited to home entertainment equipment control. For example, the present invention may be integrated with a locking mechanism for controlling access to a refrigerator or pantry, thereby serving to control diet. In certain embodiments, the present invention may be programmed to cause a delay period from the time that access to a refrigerator or pantry is desired to the time that access is actually allowed.

These and further and other objects and features of the invention are apparent in the disclosure, which includes the above and ongoing written specification, with the claims and the drawings.

DETAILED DESCRIPTION OF THE DRAWINGS

Figure 1:
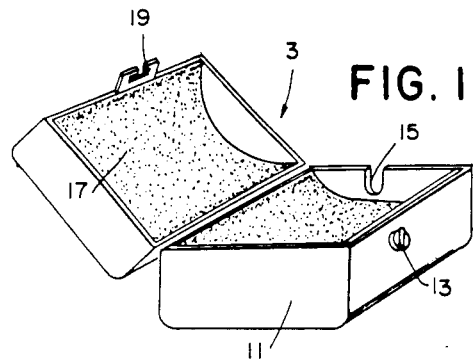
FIG. 1 illustrates a prior art locking box control/safety device.

The prior art safety/control device generally referred to by the numeral 3 in FIG. 1 consists of a housing 11, the interior of which is lined with cushioning or padding 17, providing a secure area into which an appliance power plug may be placed. A yoke 15 is provided for the appliance cord. A lock latch 19 engages with lock 13 to prohibit access to an enclosed appliance power plug.

Figure 2:
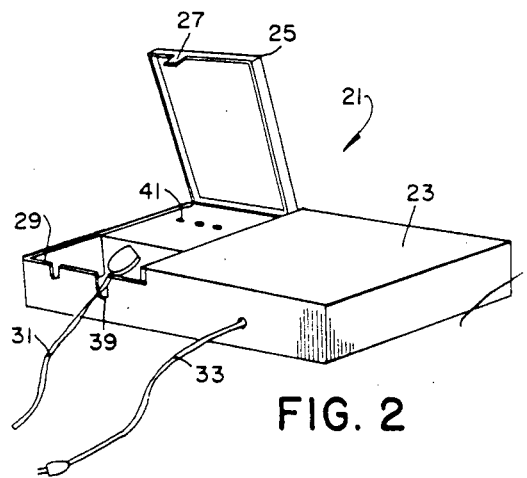
FIG. 2 illustrates an embodiment of the present invention in which access to an appliance is key-activated.

FIG. 2 shows a basic embodiment of the present invention generally referred to by the numeral 21. A door 25 in housing 23 is locked by interengaging locking components 27 and 29, thereby restricting access to time limit controls 41 and appliance power plug 39. In the invention as illustrated, controls 41 are used to set maximum operating time limits for the appliance being controlled. A maximum time limit can be set on cumulative operation time, and time limits can be set on specific switches, thereby controlling each individual's total allowed time. FIG. 2 also shows appliance power cord 31 and power source cord 33.

Figure 3:
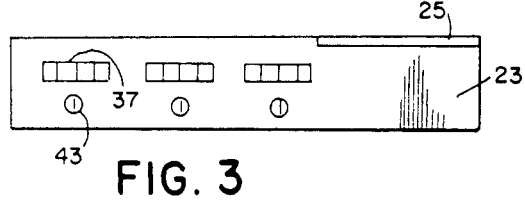
FIG. 3 is a front view of the apparatus shown in FIG. 2, showing time displays and keyholes.

FIG. 3 clarifies the operation of the invention as shown in embodiment 21 by showing a front view of the apparatus. Lock-activated switches 43 are used to control operation of an appliance. Only the person or persons with the appropriate key or keys can use the appliance. Three time displays 37 are also shown in this embodiment. One time display monitors cumulative operation time of an appliance, while the other time displays monitor an individual's use of the appliance. When an individual having a particular key to a lock-activated switch turns the switch on, the corresponding individual time display and the cumulative time display will record and display elapsed time. The controlled appliance will stop operation when the preset time limits have expired, or when the lock-activated switch is turned off. Such an embodiment is particularly useful when a parent wishes to control the total amount of television viewing time of a child over a time period such as a day or week, but does not wish to restrict the time of day during which television can be watched. The time displays are shown in FIG. 3 to be aligned in the front portion of housing 23. The hinged edge of locking door 25 is also illustrated.

A simpler version of the apparatus as shown in FIGS. 2 and 3 would involve just one lock-activated switch and no controls 41.

Figure 4:
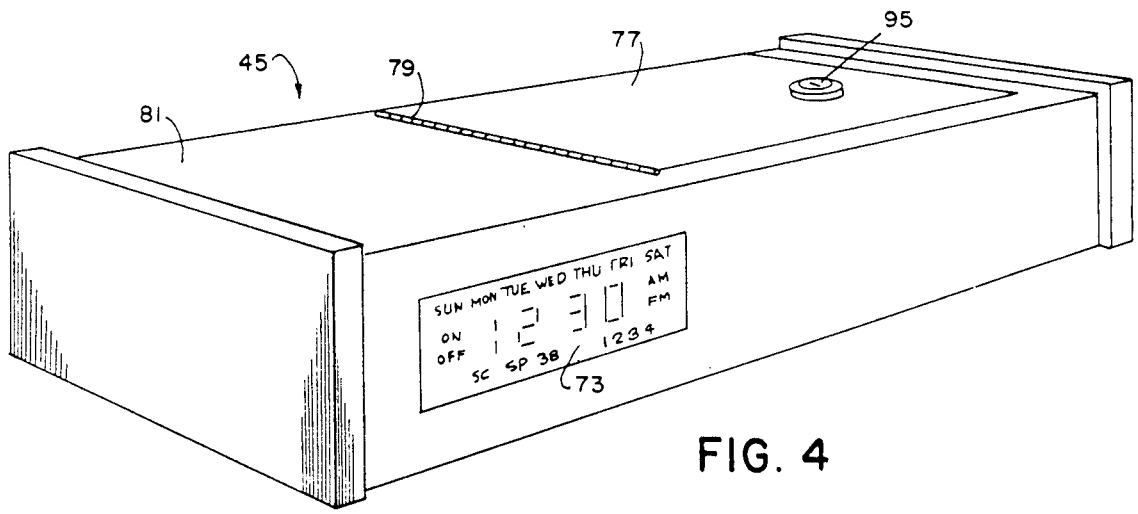
FIG. 4 illustrates a more sophisticated embodiment of the present invention.

FIG. 4 provides a perspective view of a more sophisticated embodiment of the present invention, generally referred to by the numeral 45. The front portion of housing 81 contains a multipurpose display 73. The display may show a variety of values, such as programming parameters, elapsed time of a controlled appliances operation, cumulative operation time or the time of day. A door 77 is attached to the top surface of housing 81 by hinges 79. Lock 95 restricts access to the components of the invention within the housing 81.

Figure 5:
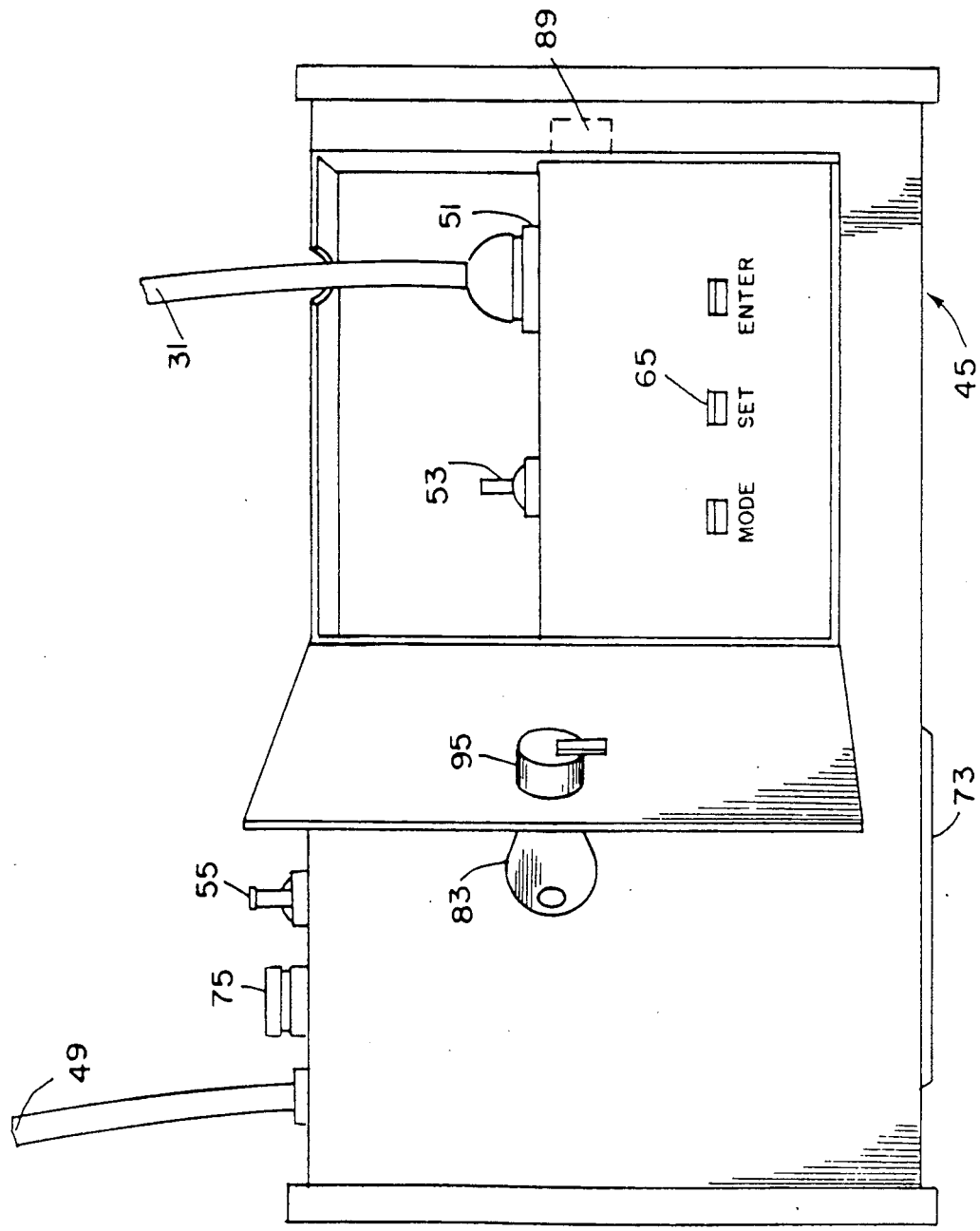
FIG. 5 is another view of the embodiment shown in FIG. 4, illustrating components of the invention within the locked portion of the housing.

FIG. 5 shows a top view of the apparatus 45. Key 83 has opened lock 95 on door 77. Within the restricted access area are three programming control buttons 65, a load receptacle 51 into which an appliance cord 31 is plugged, a manual override switch 53, and a slot 89 for the latch of lock 95. The rear surface of housing 81 has a yoke 39 for accommodating an appliance cord, a power switch 55, a fuse 75, and a 120 VAC source cord 49, which may be plugged into a standard wall outlet. An edge of the multi-purpose display 73 on the front portion of the housing is shown.

Figure 6:
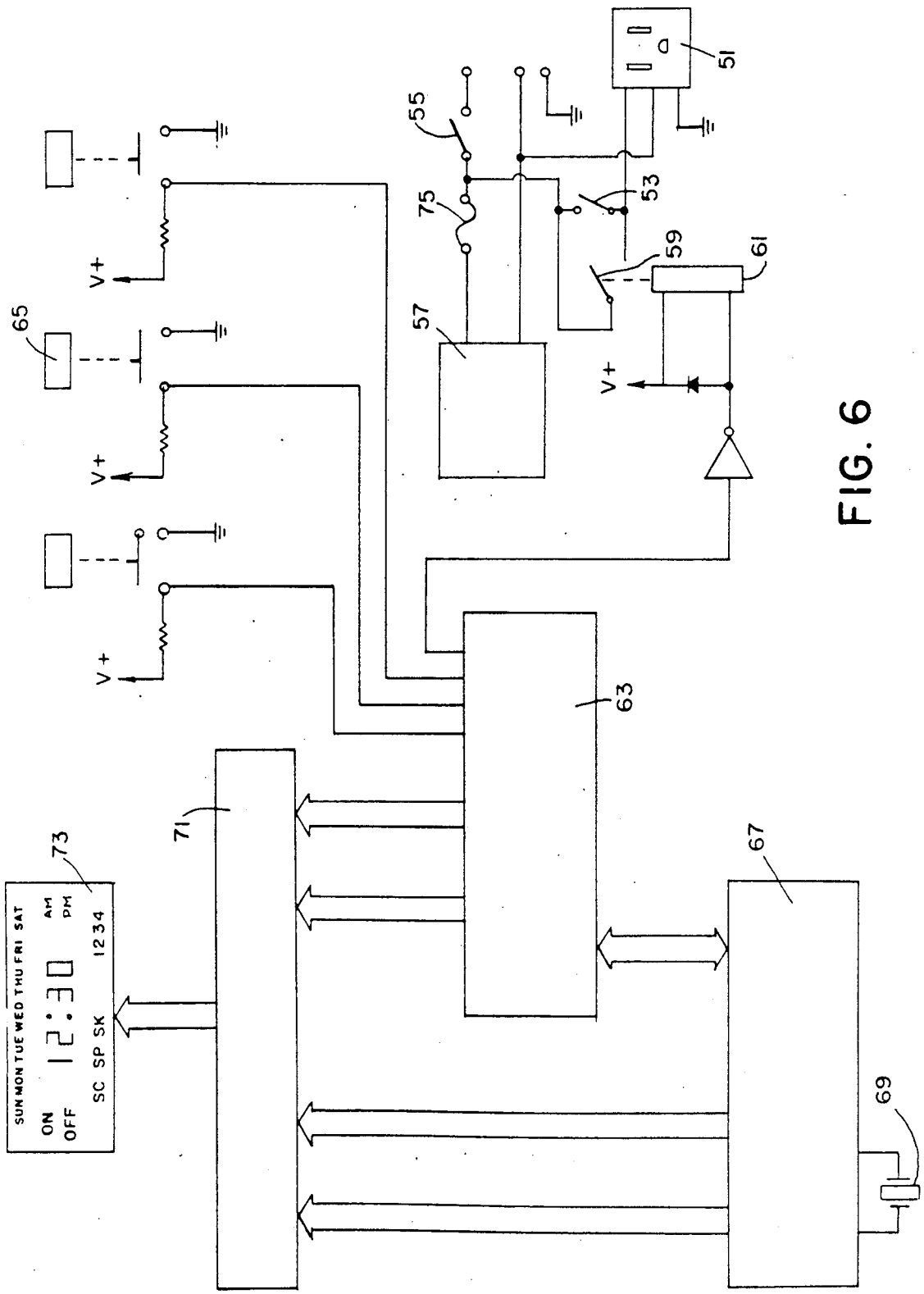
FIG. 6 provides a general illustration of control circuitry for the embodiment of the present invention shown in FIGS. 4 and 5.

FIG. 6 illustrates control circuitry for embodiment 45. The illustration shows power supply 57 with battery backup electrically connected to power switch 55 and fuse 75. Two other switches are shown to control power flow. Manual override switch 53 remains open unless a person having access to the switch wishes to operate the controlled appliance. Switch 59 is controlled by the programmed signals in solenoid 61. Three programming control buttons 65 are used to select a mode, enter programming parameters and set the program data. The control buttons 65 are electrically connected to a RAM input/output chip 63. The RAM interacts with a microprocessor 67 having internal ROM to supply electrical signals controlling power flow to an appliance. The RAM and microprocessor also send signals to a display interface 71, which in turn converts the signals into legible information visible on the multi-purpose display 73. A system clock 69 provides the time base for the control circuitries operation. The plug of the appliance to be controlled is inserted into load receptacle 51.

Figure 7:
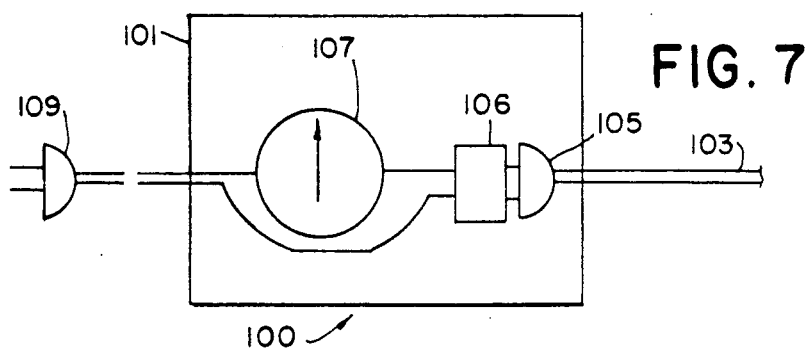
FIG. 7 is a simplified form of the present invention.

A simplified preferred embodiment of the invention is generally indicated by the numeral 100 in the schematically shown box 101 in FIG. 7. A line 103 from a television set terminates in a conventional plug 105, which is connected to socket 106 within the box. A cumulative timer 107 is mounted in the box for running when the television set is on and line 103 is drawing power. A plug 109 supplies power to the timer 107 and to the television supply line 103.

Figure 8:
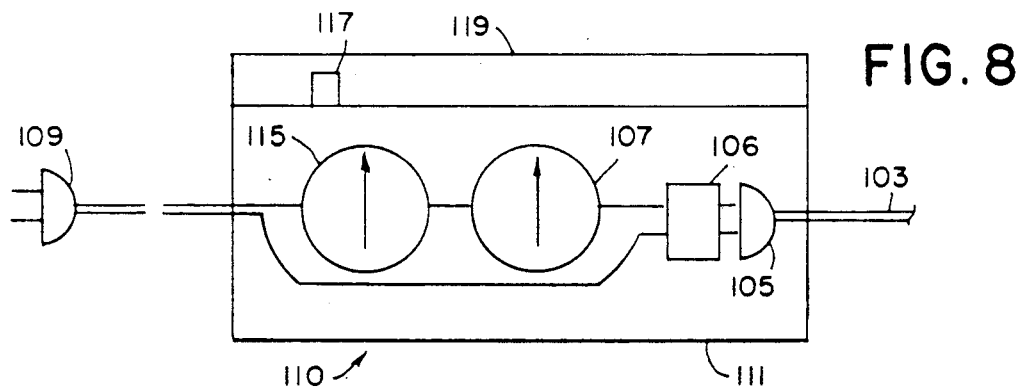
FIG. 8 is a preferred embodiment of the present invention.

A preferred form of the invention is generally indicated by the numeral 110 in the schematic representation shown in FIG. 8. Box 111 has two timers, a continuously running timer 107 and a resettable timer 115, having a reset button 117 which may be accessed by unlocking and opening cover 119.

Timer 107 simply shows the total time that the television appliance has been in use. Timer 115 shows the television appliance usage time since the last resetting of the timer 115.

The faces of both timers 107 and 115 are visible on the outside of the box.

In an alternate form of the invention, timer 115 may operate to disconnect the circuit and prevent power supply between wall plug 109 and the appliance lines 103 after a predetermined time interval.

Figure 9:
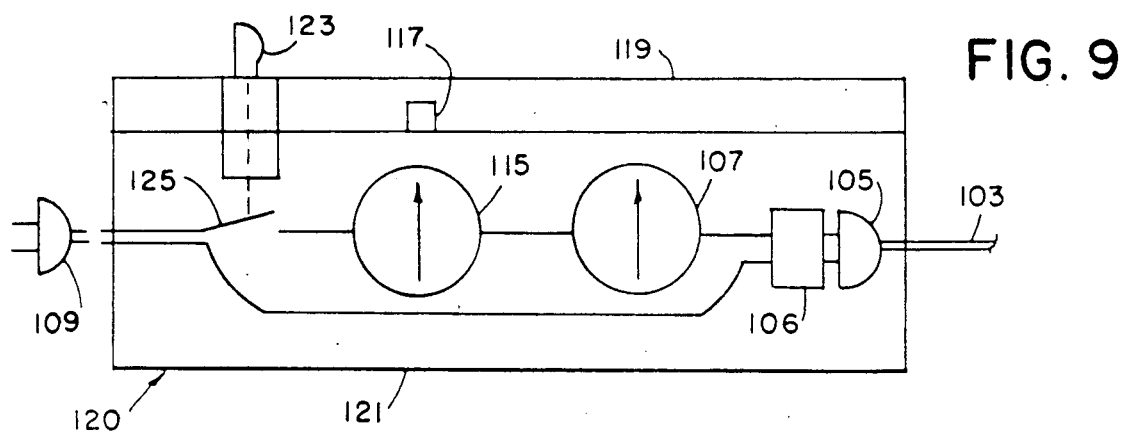
FIG. 9 is a modification of the preferred embodiment shown in FIG. 8.

An alternate form of the invention is generally indicated by the numeral 120 in FIG. 9. Box 121 contains a television plug 105, a continuous timer 107, and a resettable timer 115 controlled by reset button 117. Removable key 123 controls switch 125, which selectively completes and disconnects the circuit between the television appliance power line 103 and the wall plug 109. Key 123 also unlocks the cover 119 to provide access to the reset button 117.

While the invention has been described with reference to specific embodiments, modifications and variations of the invention may be constructed without departing from the scope of the invention, which is described in the following claims.

I claim:

1. Apparatus for recording and controlling the use of home entertainment equipment, comprising a housing means with a locking door for enclosing and restricting access to a compartment within said housing means, the compartment containing programming and power control components, the programming components comprising buttons for inputting operation time parameters, the buttons comprising a first button for setting a mode that allows for either time duration, or time duration and time period, to be controlled, a second button for inputting time parameters, and a third button for setting the time parameters into play, and the power control component comprising an override switch for circumventing any control functions of the apparatus, and a multi-purpose display for indicating programmed parameters, cumulative operation time for recording total time of appliance use since last set, individual operation time durations, and allowed operation time periods, the display, the control buttons and the override switch all being connected to operation control circuitry within the housing, comprising a power supply with battery backup, the power supply being connected to a power switch which is accessible from an external surface of the housing, the power supply also connected to the override switch within the enclosed compartment, and also connected to a switch controlled by a solenoid, which in turn is connected to and controlled by a microprocessor via electrical signals from a RAM/IO chip, the RAM/IO chip and microprocessor both being connected to a display interface as well, thereby transmitting electrical signals that are converted by the display interface into legible matter appearing on the multi-purpose display.

2. Apparatus for recording and controlling the use of home entertainment equipment, comprising a housing means having a hinged door with locking means that encloses and restricts access to a compartment within the housing means containing programming components and power control components, and an appliance plug receptacle, the compartment having an opening for receiving an appliance electrical cord, the apparatus further comprising a first cumulative time monitoring means and display means that monitors and displays total amount of time that a controlled appliance has been operating since a last time the cumulative time display was set and a second resettable time monitoring and display means connected to an operation control means by electrical circuitry such that when the control means acitvates power to the controlled appliance, the resettable time display means automatically resets from a previous elapsed time display and begins monitoring and displaying current elapsed operation time.

3. The apparatus of claim 2, wherein the programming components comprise two buttons, a first button for entering total amounts of allowed appliance operation time values, and a second button for fixing the time values within an operation control means of the apparatus, the operation control means comprising a microprocessor and a RAM/IO chip that sends signals to a switch to cut off power when a programmed time value of equipment operation has expired, the operation control means also being connected to a display interface which receives display signals and converts them into a legible display of elapsed operation time or time remaining until power is turned off, the time being indicated on a display means on an external surface of the housing.

4. The apparatus of claim 2, wherein the programming components further comprise three buttons for inputting operation time parameters for a plurality of power control components, the power control components comprising key activated and manually operated power switches, the three buttons comprising a button for selecting a particular key activated switch, a button for inputting time parameters, and a button for setting the time parameters, the key activated switches also being electrically connected to a display processor which sends display signals to a plurality of displays, one display indicating cumulative operating time, and individual displays for each key activated switch indicating total operating time on an associated switch, all displays being able to indicate programmed time parameters.

5. The apparatus of claim 4, wherein further the three buttons allow timing parameters to be entered for a period of seven days with a plurality of individual on-/off cycles per day, thereby controlling both the amount of time that a controlled appliance is used and the time periods during which the appliance can be used.

6. The apparatus of claim 4, wherein further the three buttons allow appliance operation time to be programmed in a countdown fashion, wherein one or more users are allotted a specific amount of time under which to use the appliance, and during which remaining time is counted down until fully depleted, at which point power is disabled.

7. The apparatus of claim 3, wherein further the two buttons are for operating and programming in one of two time control modes, a first mode enabling control of appliance operation time in a countdown fashion, and a second mode enabling control of both operation time amount and time periods of operation.

8. The apparatus of claim 4, wherein the manually operated power switch is located on an external surface of the housing means.

9. The apparatus of claim 2, wherein the housing means further comprises a receptacle within an external surface for receiving a fuse.

10. The apparatus of claim 2, wherein the appliance plug receptacle further comprises cushioning in an internal portion for safely encasing an appliance plug.

11. The apparatus of claim 2, wherein the locking means further comprises a lock and key.

12. The apparatus of claim 2, wherein the locking means further comprises a child-proof snap.

13. The apparatus of claim 2, wherein the locking means further comprises a combination lock.

14. The apparatus of claim 2, wherein the locking means further comprises a digital code combination.

15. Apparatus for recording and controlling the use of home entertainment equipment, comprising a housing means having a locking door that encloses and restricts access to a compartment within the housing means containing power control components and an appliance plug receptacle, the power control components consisting of a manual override switch, the compartment also having an opening for receiving an appliance electrical cord, the apparatus further comprising additional power control means accessible from an external surface of the housing means, time monitoring means and display means, one display indicating cumulative operating time for recording total time of appliance use since last set.

16. The apparatus of claim 15, wherein the externally accessible power control means comprises a key activated switch.

17. The apparatus of claim 15, wherein the externally accessible power control means comprises multiple key activated switches, each having a unique key.

18. Television appliance use monitoring apparatus, comprising a box, a first resettable timer mounted within the box and having a face visible on an outside of the box for recording total time of appliance use since last set, a connector in the box for receiving a power cord from a television appliance, a second power cord extending from the box, and a plug connected to the second power cord for connecting the second power cord to a wall outlet, and conductors within the box connected to the timer and to the connector for operating the timer when power is drawn on the television appliance cord and a second timer mounted within the box for automatically resetting and monitoring current elapsed time operation.

19. The apparatus of claim 18, wherein the second resettable timer mounted within the box has a display face on an exterior of the box, and is connected to the conductors within the box for running the second timer with the first timer when power is being drawn on the television appliance cord.

20. The apparatus of claim 19, further comprising a lockable cover on the box and a reset button mounted in the box within the lockable cover for resetting the second timer.

21. The apparatus of claim 20, wherein the second timer includes an interruptor for interrupting the conductors within the box after a predetermined resettable time.

22. The apparatus of claim 20, further comprising a switch connected to the conductors within the box for completing and interrupting the conductors, and a key insertable in the box and connectable to the switch for operating the switch.

23. The apparatus of claim 22, wherein the key is connected to a lock on the box for locking and unlocking the cover and providing access to the reset button.

* * * * *